Figure 1:
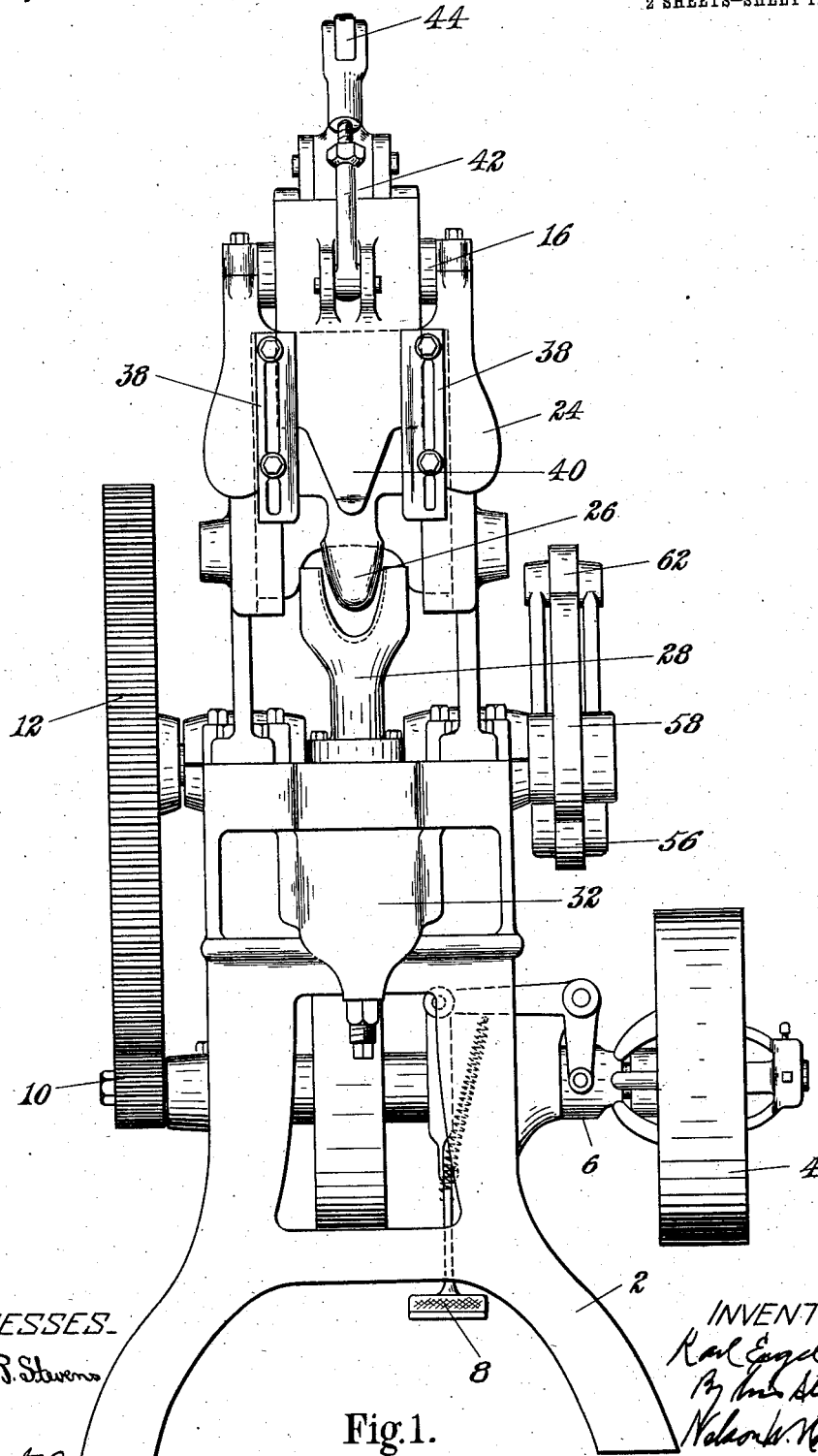

K. ENGEL.
MACHINE FOR FORMING UPPERS OF BOOTS AND SHOES.
APPLICATION FILED AUG. 5, 1907.

1,027,408.

Patented May 28, 1912.
2 SHEETS—SHEET 1.

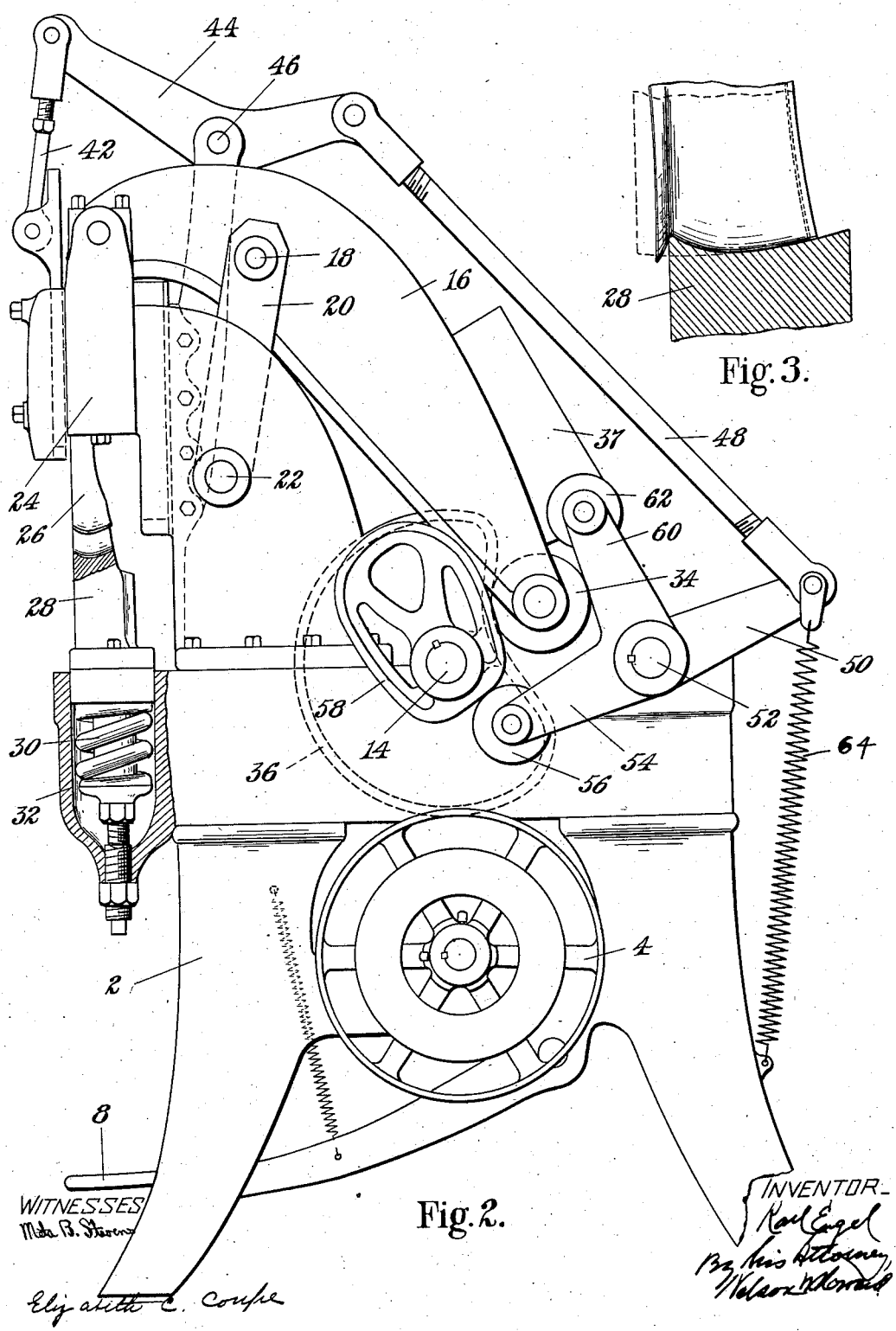

UNITED STATES PATENT OFFICE.

KARL ENGEL, OF REVERE, MASSACHUSETTS, ASSIGNOR TO UNITED SHOE MACHINERY COMPANY, OF PATERSON, NEW JERSEY, A CORPORATION OF NEW JERSEY.

MACHINE FOR FORMING UPPERS OF BOOTS AND SHOES.

1,027,408.  Specification of Letters Patent.  Patented May 28, 1912.

Application filed August 5, 1907. Serial No. 387,024.

*To all whom it may concern:*

Be it known that I, KARL ENGEL, a subject of the Emperor of Germany, residing at Revere, in the county of Suffolk and Commonwealth of Massachusetts, have invented certain Improvements in Machines for Forming Uppers of Boots and Shoes, of which the following description, in connection with the accompanying drawings, is a specification, like reference characters on the drawings indicating like parts in the several figures.

This invention relates to machines for use in the manufacture of stitch-down shoes, the term "stitch-down" being applied to shoes the uppers of which have outturned portions to which the soles are attached.

As usually constructed, the uppers of stitch-down shoes are turned out along a portion of, or along the entire lower edge, the outturned portions forming a flange to which the sole is attached. When stiff leather is used or when portions of the upper are reinforced by stiffening material, it is frequently necessary to mold the stiff portions of the upper, especially the portions about the toe and heel, into their outturned form in order that the sole may be conveniently attached. Furthermore it is frequently desirable to mold portions of the upper in the turning out operation in order to prevent the formation of unsightly wrinkles in places where the curvature is abrupt, as, for example, about the heel and toe, and also to cause the excess of leather in some parts to be forced into others where it is needed.

This invention relates especially to machines for turning out or for molding and turning out the heel or counter portions of uppers of stitch-down shoes, although many of its principles of operation can be applied equally well to machines for turning out or for molding and turning out other portions of such uppers.

The general purpose of the invention is to provide a machine which will form automatically an outturned flange upon a counter, or counter portion of an upper, or other similarly shaped piece of flexible material.

One object of the invention is to provide a machine which will automatically turn out an upper or counter, or both upper and counter, to form a flange thereon without tearing or splitting the portions turned out.

Another object of the invention is to provide means for preparing the parts to be turned out for the turning out operation, and for so shaping them that the outturned portion will have a tendency to keep its outturned position.

A further object of the invention is to provide means for turning out an upper in the region of the counter which will give to all parts of the upper operated upon a smooth appearance.

The invention comprehends also the combination with means for turning out the counter or upper, or both counter and upper, of means for molding the counter or counter portions of the upper, or both counter and counter portions of the upper, into desired form.

The invention comprehends further the combination of the features hereinbefore specified in such manner that each operation contributes to the successful performance of the succeeding operation, so that each operation may be said to be a step in the operation of preparing the upper for the attachment of the sole. In the preferred embodiment of the invention this inter-relation of the various operations is exemplified in the arrangement whereby the mechanism which molds the counter or counter portion of the upper, or both simultaneously, at the same time gathers in the counter, or upper, or counter and upper, on the line along which it is to be turned out and presses out the wrinkles caused by the gathering operation. In the preferred embodiment of the invention also the molding mechanism holds the work in position for the operation of the turning out mechanism.

In the accompanying drawings, Figure 1 is a front elevation of one embodiment of the invention; Fig. 2 is a side elevation of the same with parts shown in section; and Fig. 3 shows in dotted and in full lines a piece of work before and after being operated upon.

In the frame 2 of the machine is mounted a driving shaft to which may be clutched a constantly moving pulley 4 by means of suitable clutch mechanism 6 operated by a treadle 8. The driving shaft carries at one end a small gear 10 by which movement is imparted to a large gear 12 upon a shaft 14 mounted in the frame above the driving shaft. A large forked lever 16, fulcrumed at 18 upon swinging arms 20 pivoted at 22 in the machine frame, is connected at its forward end to a slide 24 carrying the male mold 26. The male mold 26, cut away at its back side to receive the toe portion when operating upon the counter portion of a complete upper, is adapted to coöperate with a female mold 28 mounted with provision for yielding movement upon a spring 30 adjustably confined in a casing 32 beneath said mold. The lever 16 carries at its other end a cam roll 34 held by the weight of this end of the lever constantly in contact with a cam 36 upon the shaft 14. The weight of this end of the lever 16 is increased by the addition of the block 37. The cam 36 is of such shape that as it rotates with the shaft 14 it causes the lever 16 to move the male mold 26 into contact with the female mold 28, or into contact with the work held in the female mold, and to press the work into the shape of the molds. Mounted to slide in guides 38, 38, upon the slide 24 is a flange turner 40. The flange turner 40 is connected by a link 42 to one arm of a lever 44 fulcrumed at 46. The other arm of the lever 44 is connected by a rod 48 to an arm 50 attached to the rock-shaft 52. A second arm 54 upon the rock-shaft 52 carries a cam roll 56 which engages a cam 58 upon the shaft 14. Extending at approximately right angles to the arm 54 is a third lever arm 60 carrying a cam roll 62 adapted to cause the return of the flange turner 40 to its uppermost position should the spring 64, connected to the frame and to the arm 50, fail to return it.

For the successful operation of the flange turner 40, it has been found necessary to give to the material clamped between the male and female molds a peculiar shape. It has been found that with a simple U-shaped piece of material, straight in transverse section or curved to the extent that counters and uppers are usually curved to fit the back of the heel, the operation of the flange turner is unsatisfactory since the flange is usually torn in the operation of turning, this being due to the fact that the peripheral length of the flange is greater than that of the material upon which it is formed. It has also been found that a convenient way to overcome this difficulty is to cause the material to be gathered in along the turning line before or during the turning operation to provide a fullness along this line, so that a flange may be formed, if desired, having a peripheral length not much, if any, greater than the original peripheral length of the material upon which the flange is formed. In the present embodiment of the invention, this gathering in of the material along the turning line is effected by the molds in the molding operation, and the wrinkles or folds formed by the gathering in are thus pressed out at the same time. As shown in Figs. 2 and 3, the female mold, for this purpose, is concaved transversely, with the more abruptly descending portion of the concavity lying adjacent to the side of the mold upon which the flange is turned. The male mold is shaped to fit the female mold. Fig. 3 shows the effect upon the material of thus shaping the molds. As shown in this figure, the material will have a reduced periphery along the turning line which, in this case, is the edge of the mold, and the flange portion may be turned over until it has the original peripheral length of the material at all, without stretching the material in the periphery of the surplus material within the periphery of the outturned portion being folded upon itself, or compressed into more compact form. Preferably, however, the flange formed on the upper or counter, or both upper and counter, has a peripheral length somewhat greater than the original peripheral length of the material from which it is formed. The increase in peripheral length of the completed flange over the original peripheral length of the material from which it is formed is effected in the construction shown in two ways. As will be seen from an inspection of Fig. 1, the movement of the flange turner is from the shank portion of the upper to be molded toward the back of the heel. The flange turner is so shaped that the material which is to form the flange in the region of the shank is engaged first and is moved somewhat toward the material which is to form the flange at the back of the heel. This movement of the excess material from the region of the shank toward the back of the heel facilitates the formation of the flange in the latter region. As the end of the flange turner engages the material at the back of the heel it tends to stretch the material somewhat in order that it may turn it over flat upon the side of the female mold. It will thus be seen that the flange at the back of the heel has its periphery increased both by the movement of the material from the region of the shank toward the back of the heel, to facilitate the formation of the flange, and also by stretching of the material in the flange itself.

The operation of the machine is as follows: The material to be operated upon having been placed upon the female mold, the treadle is depressed and the driving shaft set in motion. The male mold 26 is first moved down through the action of cam 36 on lever 16 to mold the material into U shape in the female mold and, at the same time, to gather in the material along the line of the front edge of the female mold. After the material has been shaped and while it is still clamped by the molds, the flange turner descends into the U formed by the material projecting beyond the front of the molds, and turns this material over upon the side of the female mold, this turning operation being easily effected owing to the gathering in of the material along the edge of the mold. The fullness of material inside the periphery of the flange formed by the outturned portion gives to the flange a tendency to remain in its outturned position.

In the appended claims, the term "leather" has been used for convenience to describe the material operated upon, since the machine is designed primarily to form flanges upon counters and counter portions of shoe uppers, which parts are usually made of leather. It is obvious, however, that the invention is not limited to use with leather nor to use upon counters or counter portions of uppers but may be used to form flanges upon any U-shaped or approximately U-shaped piece of flexible material. It may also be used upon several different kinds of material at the same time. A flange may thus be formed upon the lining as well as upon the counter and upon the counter portion of the upper after all these parts have been assembled in the relations which they are to maintain to each other in the completed shoe.

It will be noted that the use of this machine to form outturned flanges upon counters or other similarly shaped portions of leather involves the employment of a novel method of forming such flanges. Protection for this method has been obtained in U. S. Letters Patent No. 1,001,745, dated August 29, 1911.

Having described my invention, what I claim as new and desire to secure by Letters Patent of the United States is:—

1. A machine of the class described, having, in combination, a flange turner arranged to engage and turn out a flange upon a portion of leather curved approximately in the plane of movement of said turner, and means for holding the leather in its curved condition for the action of said turner, said means being constructed to gather in the leather along the turning line to provide a fullness for the turning operation.

2. In a machine of the class described, the combination with a flange turner adapted to engage and turn out a portion of leather curved approximately in the plane of the path of the flange turner, of means for gathering in the leather along the turning line to provide a fullness for the turning operation constructed to determine positively the location of said turning line.

3. In a machine of the class described, the combination with a male mold curved in the plane of one of its faces and a coöperating female mold, said molds being shaped to gather in the material which is being molded at or near the curved line formed by their meeting edges to reduce the periphery of the molded material along this line, of means for turning out the material projecting beyond the said line.

4. In a machine of the class described, the combination with means for molding a counter blank into U shape, said means comprising means for gathering in the blank material along a flange line, of means moving in substantially the plane of said line for turning out the material beyond the flange line to form an outturned flange.

5. In a machine of the class described, the combination with a female mold and a male mold, said molds being adapted to shape and clamp a counter between them with a flange forming portion projecting, of a flange turner arranged to move over said male mold toward said female mold to turn out upon said female mold the part of the clamped blank projecting beyond the molds to form an outturned flange on said counter.

6. In a machine of the class described, the combination with a U-shaped female mold transversely concaved, said concavity descending abruptly from one face of said mold and gradually from the other face, of a male mold fitting into said female mold, and means for turning out upon the face of said female mold adjacent to the abruptly descending portion of the transverse concavity the projecting portions of the material clamped between said molds.

7. In a machine of the class described, the combination with a stationary U-shaped female mold and a reciprocating coöperating male mold said female mold being transversely concaved, of a reciprocating flange-turner having operative movement corresponding in direction to that of said male mold, and means for actuating said parts in such order that the flange turner operates to turn out upon the female mold projecting portions of the material clamped by the operative movement of said male mold.

8. In a machine of the class described, in combination, a male mold and a coöperating female mold shaped to mold a piece of flexible material grasped between them into U- form, together with means for turning out the material projecting beyond the plane of the curved line formed by their meeting edges.

9. In a machine of the class described, the combination with means for supporting a U-shaped piece of flexible material in position to be operated upon, of means for forming upon said U-shaped piece of material an outturned flange, said means being constructed and arranged to operate first upon the sides of the U and then upon the end of the U.

10. A machine for forming out-turned flanges on shoe uppers, comprising molding means for shaping the heel end of the upper into U-form and to hold the same with an edge projecting, and a presser mounted to travel across said projecting edge from the forward toward the rear end of the shoe upper and having its portion nearest to such rear end shaped so as to enter between the sides of the U and lay said edge outward.

11. A machine for forming outwardly-turned flanges on shoe uppers, comprising coöperating male and female molds adapted to shape an upper into substantially U-form and to hold the same with the edge, which in use is nearest the sole of a shoe, projecting from the mold, a presser having a wedge-shaped end, mounted with capability of traveling over the mold, and means for bringing such wedge-shaped end into the opening of the U and passing the presser over the mold, whereby the edge of the upper is spread out and formed into a permanent outward flange.

12. A machine for forming outwardly-turned flanges on shoe uppers, comprising a mold adapted to form an upper into substantially U-shape, a presser having a protuberant, blunt, generally wedge-shaped end, a guide in which said presser is enabled to travel and in which it is held in a plane parallel and closely adjacent to the surface of the mold, and means for reciprocating said presser so as to cause its wedge-shaped end to enter the opening between the sides of the U-formed blank and press the edges thereof outward.

In testimony whereof I have signed my name to this specification in the presence of two subscribing witnesses.

KARL ENGEL.

Witnesses:
H. DORSEY SPENCER,
ARTHUR L. RUSSELL.

---

Copies of this patent may be obtained for five cents each, by addressing the "Commissioner of Patents, Washington, D. C."